United States Patent
Topaloglu

(10) Patent No.: US 10,936,281 B2
(45) Date of Patent: Mar. 2, 2021

(54) AUTOMATIC SLIDE PAGE PROGRESSION BASED ON VERBAL AND VISUAL CUES

(71) Applicant: International Business Machines Corporation, Armonk, NY (US)

(72) Inventor: Rasit Onur Topaloglu, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 124 days.

(21) Appl. No.: 16/225,461

(22) Filed: Dec. 19, 2018

(65) Prior Publication Data
US 2020/0201598 A1   Jun. 25, 2020

(51) Int. Cl.
| G06F 16/438 | (2019.01) |
| G06F 3/16 | (2006.01) |
| G10L 15/18 | (2013.01) |
| G10L 15/07 | (2013.01) |
| G10L 15/08 | (2006.01) |

(52) U.S. Cl.
CPC .......... G06F 3/167 (2013.01); G06F 16/4393 (2019.01); G10L 15/07 (2013.01); G10L 15/1807 (2013.01); G10L 2015/088 (2013.01)

(58) Field of Classification Search
CPC ..... G06F 3/167; G06F 16/4393; G10L 15/07; G10L 15/1807; G10L 2015/088
See application file for complete search history.

(56) References Cited

U.S. PATENT DOCUMENTS

| 6,415,306 B2 | 7/2002 | Seaman |
| 6,889,138 B1 | 5/2005 | Krull et al. |
| 6,892,135 B1 | 5/2005 | Krull et al. |
| 7,308,359 B1 | 12/2007 | Krull et al. |
| 7,328,158 B1 | 2/2008 | Burridge et al. |
| 8,161,246 B2 | 4/2012 | Hooker et al. |

(Continued)

FOREIGN PATENT DOCUMENTS

| EP | 1892608 A1 | 2/2008 |
| JP | 2018005011 A | 1/2018 |
| WO | 02052527 A1 | 7/2002 |

OTHER PUBLICATIONS

Prasad et al., "Document Summarization and Information Extraction for Generation of Presentation Slides", 2009 Int'l Conf. on Advances in Recent Technologies in Communication and Computing; 2009 IEEE, pp. 126-128.

(Continued)

*Primary Examiner* — Nafiz E Hoque
(74) *Attorney, Agent, or Firm* — Cantor Colburn LLP; Teddi Maranzano

(57) ABSTRACT

Methods, systems, and computer program products controlling navigation of a visual aid during a presentation are provided. An example method includes monitoring, speech of an individual during the presentation. Evaluating one or more verbal and visual cues indicative of an end of a slide of a plurality of slides of the visual aid. Predicting a probability of changing the slide to a next slide of the plurality of slides in a predetermined amount of time, in which the probability is predicted based, at least in part, on the evaluated one or more verbal and visual cues. Displaying the next slide at the predetermined amount of time from the predicting.

17 Claims, 6 Drawing Sheets

(56) References Cited

U.S. PATENT DOCUMENTS

| | | |
|---|---|---|
| 8,219,633 B2 | 7/2012 | Fainberg et al. |
| 8,321,533 B2 | 11/2012 | Fainberg et al. |
| 8,346,885 B2 | 1/2013 | Fainberg et al. |
| 8,433,853 B2 | 4/2013 | Eddy et al. |
| 8,482,381 B2 | 7/2013 | Chatterjee et al. |
| 8,661,090 B2 | 2/2014 | Fainberg et al. |
| 8,687,023 B2 | 4/2014 | Markiewicz et al. |
| 8,707,174 B2 | 4/2014 | Hinckley et al. |
| 8,751,970 B2 | 6/2014 | Hinckley et al. |
| 8,856,263 B2 | 10/2014 | Fainberg et al. |
| 9,020,825 B1 | 4/2015 | Garber |
| 9,116,989 B1 | 8/2015 | Ehlen et al. |
| 9,223,413 B2 | 12/2015 | Pakki et al. |
| 9,335,913 B2 | 5/2016 | Stephenson et al. |
| 9,652,402 B2 | 5/2017 | Venkatasubramanian et al. |
| 9,681,094 B1 | 6/2017 | Faulkner et al. |
| 9,921,722 B2 | 3/2018 | Phelan-Tran |
| 2002/0080927 A1 | 6/2002 | Uppaluru |
| 2003/0065655 A1 | 4/2003 | Syeda-Mahmood |
| 2005/0005266 A1 | 1/2005 | Datig |
| 2005/0078172 A1 | 4/2005 | Harville et al. |
| 2007/0283270 A1 | 12/2007 | Sand et al. |
| 2008/0046930 A1 | 2/2008 | Smith et al. |
| 2008/0120665 A1 | 5/2008 | Relyea et al. |
| 2008/0270344 A1 | 10/2008 | Yurick et al. |
| 2009/0106659 A1 | 4/2009 | Rosser et al. |
| 2009/0254839 A1 | 10/2009 | Kripalani et al. |
| 2009/0325705 A1 | 12/2009 | Filer et al. |
| 2010/0122171 A1 | 5/2010 | Bauchot et al. |
| 2010/0169790 A1 | 7/2010 | Vaughan et al. |
| 2011/0093820 A1 | 4/2011 | Zhang et al. |
| 2011/0301943 A1 | 12/2011 | Patch |
| 2012/0124090 A1 | 5/2012 | Matz et al. |
| 2012/0323575 A1 | 12/2012 | Gibbon et al. |
| 2012/0323579 A1 | 12/2012 | Gibbon et al. |
| 2013/0280689 A1 | 10/2013 | Meer |
| 2014/0006550 A1 | 1/2014 | Cain et al. |
| 2014/0240231 A1 | 8/2014 | Minnen |
| 2015/0132735 A1* | 5/2015 | Edge .................... G06Q 10/10 434/308 |
| 2015/0169069 A1 | 6/2015 | Lo et al. |
| 2015/0170643 A1 | 6/2015 | Nicholson et al. |
| 2015/0193089 A1 | 7/2015 | Berlin et al. |
| 2015/0234800 A1* | 8/2015 | Ehlen ................... G06F 3/0482 715/202 |
| 2015/0350029 A1 | 12/2015 | Skrobotov |
| 2015/0379094 A1* | 12/2015 | Ehlen ..................... G06F 3/038 707/722 |
| 2016/0092443 A1 | 3/2016 | Hayes et al. |
| 2016/0343351 A1* | 11/2016 | Chen ..................... G06F 3/1454 |
| 2017/0075656 A1 | 3/2017 | Ehlen et al. |
| 2018/0018964 A1 | 1/2018 | Reilly et al. |
| 2018/0059796 A1 | 3/2018 | Carr et al. |
| 2018/0060028 A1 | 3/2018 | Carr et al. |
| 2018/0285312 A1 | 10/2018 | Liu et al. |
| 2019/0318010 A1* | 10/2019 | Tamir .................. G06F 16/4393 |

OTHER PUBLICATIONS

List of IBM Patents or Patent Applications Treated as Related; Date Filed: Dec. 14, 2018, 2 pages.

Mell et al.; "The NIST Definition of Cloud Computing—Recommendations of the National Institute of Standards and Technology"; U.S. Department of Commerce; Sep. 2011; 7 pages.

Pash; "Control PowerPoint Presentations with Your Voice"; LifeHacker <https://lifehacker.com/394832/394832/control-powerpoint-presentations-with-your-voice>; 2 pages.

* cited by examiner

AUTOMATIC SLIDE PAGE PROGRESSION BASED ON VERBAL AND VISUAL CUES

BACKGROUND

The present invention generally relates to methods and systems for controlling a visual aid during a presentation, and more particularly to methods and systems for controlling the navigation of a visual aid during a presentation.

During meetings and classes, it is common for presenters to use visual aids, such as slide decks, to present relevant material. Often the visual aids include a multitude of slides that each contain different information about which the presenter will speak. Currently, presenters navigate through the presentation by using a device that includes two buttons, one of which will advance the visual aid to the next slide and the other of which will revert the visual aid to the previous slide. Some systems have implemented gestures detected by cameras.

Often times during a presentation, the presenter may wish to display a slide out of the planned presentation order, perhaps in response to a question. As the length of the presentation and the number of slide in the visual aid increase, the amount of time it takes for the presenter to navigate through the visual aid to find the desired slide increases. This delay causes a disruption to the flow of the presentation and wastes the time of the presenter and the other individuals in the meeting or class.

The phrase "machine learning" broadly describes a function of an electronic system that learns from data. A machine learning system, engine, or module can include a trainable machine learning algorithm that can be trained, such as in an external cloud environment, to learn functional relationships between inputs and outputs that are currently unknown.

SUMMARY

Embodiments of the present invention provide a computer-implemented method for controlling navigation of a visual aid during a presentation. A non-limiting example of the computer-implemented method includes monitoring, by a system having one or more processors, the speech of an individual during the presentation. The method includes evaluating, by the system, one or more verbal cues indicative of an end of a slide of a plurality of slides of the visual aid, in which the evaluating is based, at least in part, on executing natural language processing on the monitored speech during a display of the slide. The method includes predicting, by the system a probability of changing the slide to a next slide of the plurality of slides in a predetermined amount of time, in which the probability is predicted based, at least in part, on the evaluated one or more verbal cues. The method includes displaying, by the system, the next slide at the predetermined amount of time from the predicting.

Embodiments of the present invention are directed to a system for controlling navigation of a visual aid during a presentation. A non-limiting example of the system includes one or more processors configured to perform a method. A non-limiting example of the method includes monitoring, by the system, speech of an individual during the presentation. The method includes evaluating, by the system, one or more verbal cues indicative of an end of a slide of a plurality of slides of the visual aid, in which the evaluating is based, at least in part, on executing natural language processing on the monitored speech during a display of the slide. The method includes predicting, by the system a probability of changing the slide to a next slide of the plurality of slides in a predetermined amount of time, in which the probability is predicted based, at least in part, on the evaluated one or more verbal cues. The method includes displaying, by the system, the next slide at the predetermined amount of time from the predicting.

Embodiments of the invention are directed to a computer program product for controlling navigation of a visual aid during a presentation, the computer program product comprising a computer readable storage medium having program instructions embodied therewith. The program instructions are executable by a system comprising one or more processors to cause the system to perform a method. A non-limiting example of the method includes monitoring, by the system, speech of an individual during the presentation. The method includes evaluating, by the system, one or more verbal cues indicative of an end of a slide of a plurality of slides of the visual aid, in which the evaluating is based, at least in part, on executing natural language processing on the monitored speech during a display of the slide. The method includes predicting, by the system a probability of changing the slide to a next slide of the plurality of slides in a predetermined amount of time, in which the probability is predicted based, at least in part, on the evaluated one or more verbal cues. The method includes displaying, by the system, the next slide at the predetermined amount of time from the predicting.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
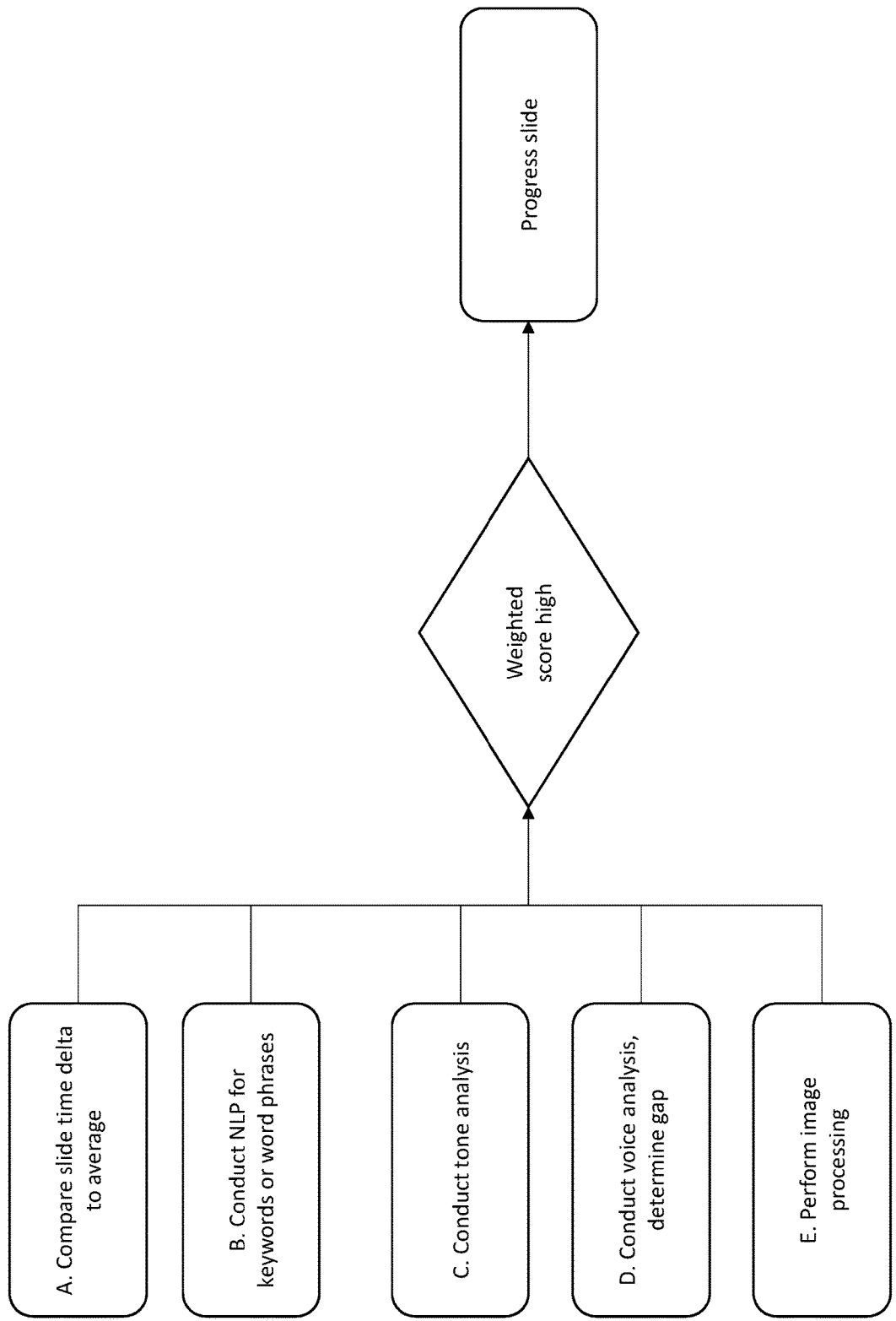
FIG. 1 depicts an example framework for controlling navigation of a visual aid during a presentation in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as noted above, during meetings and classes it is common for presenters to use visual aids, such as slide decks, to present relevant material. Often the visual aids include a multitude of slides that each contain different information about which the presenter will speak. Currently, presenters navigate through the presentation by using a device that includes two buttons, one of which will advance the visual aid to the next slide and the other of which will revert the visual aid to the previous slide. Some systems have implemented gestures detected by cameras or attempt to use voice.

Often times during a presentation, the presenter may wish to display a slide out of the planned presentation order, perhaps in response to a question. As the length of the presentation and the number of slide in the visual aid increase, the amount of time it takes for the presenter to navigate through the visual aid to find the desired slide increases. This delay causes a disruption to the flow of the presentation and wastes the time of the presenter and the other individuals in the meeting or class.

Turning now to an overview of the aspects of the invention, one or more embodiments of the invention address the above-described shortcomings of the prior art by providing systems, media, and methods that are able to execute automatic slide page progression based on verbal and/or visual clues such as, for example, using Natural Language Processing (NLP) to analyze a user's speech for verbal cues during a presentation of a slide indicating end of the slide (e.g., brief silence, keywords, vocal tone change, change in pace of speech), and then based on the analysis, predicting a probability of changing slide the slide in n-seconds, in which n may be a predetermined machine learned amount and/or a default amount. Other predetermine amounts may also be utilized such as, for example, minutes and hours, or a predetermined time of day. In some embodiments of the present invention, a brief silence is used as an indicator to move to next slide. In some embodiments of the present invention, a camera is used to look for visual cues such as a hand slide to move to the next slide. In some embodiments of the present invention, the camera and verbal cues are used together to move to next slide. In some embodiments of the present invention, a cue is evaluated as compared to a previous average slide time to improve upon decisions. In some embodiments of the present invention, a spoken text similarity to slide text similarity is analyzed, to determine that the presenter is nearing the end of the current slide. In some embodiments of the present invention, text similarity is utilized in addition to other verbal and/or visual cues.

Turning now to an overview of technologies that are more specifically relevant to aspects of the invention, as noted above, during meetings and classes it is common for presenters to use visual aids, such as slide decks, to present relevant material. Often the visual aids include a multitude of slides that each contain different information about which the presenter will speak. Currently, presenters navigate through the presentation by using a device that includes two buttons, one of which will advance the visual aid to the next slide and the other of which will revert the visual aid to the previous slide. Some systems have implemented gestures detected by cameras or attempt to use voice.

Often times during a presentation, the presenter may wish to display a slide out of the planned presentation order, perhaps in response to a question. As the length of the presentation and the number of slide in the visual aid increase, the amount of time it takes for the presenter to navigate through the visual aid to find the desired slide increases. This delay causes a disruption to the flow of the presentation and wastes the time of the presenter and the other individuals in the meeting or class.

Turning now to an overview of the aspects of the invention, one or more embodiments of the invention address the above-described shortcomings of the prior art by providing systems, media, and methods that are able to execute automatic slide page progression based on verbal and/or visual clues such as, for example, using Natural Language Processing (NLP) to analyze a user's speech for verbal cues during a presentation of a slide indicating end of the slide (e.g., brief silence, keywords, vocal tone change, change in pace of speech), and then based on the analysis, predicting a probability of changing slide the slide in n-seconds, in which n may be a predetermined machine learned amount and/or a default amount. Other predetermine amounts may also be utilized such as, for example, minutes and hours, or a predetermined time of day. In some embodiments of the present invention, a brief silence is used as an indicator to move to next slide. In some embodiments of the present invention, a camera is used to look for visual cues such as a hand slide to move to the next slide. In some embodiments of the present invention, the camera and verbal cues are used together to move to next slide. In some embodiments of the present invention, a cue is evaluated as compared to a previous average slide time to improve upon decisions. In some embodiments of the present invention, a spoken text similarity to slide text similarity is analyzed, to determine that the presenter is nearing the end of the current slide. In some embodiments of the present invention, text similarity is utilized in addition to other verbal and/or visual cues.

Figure 2:
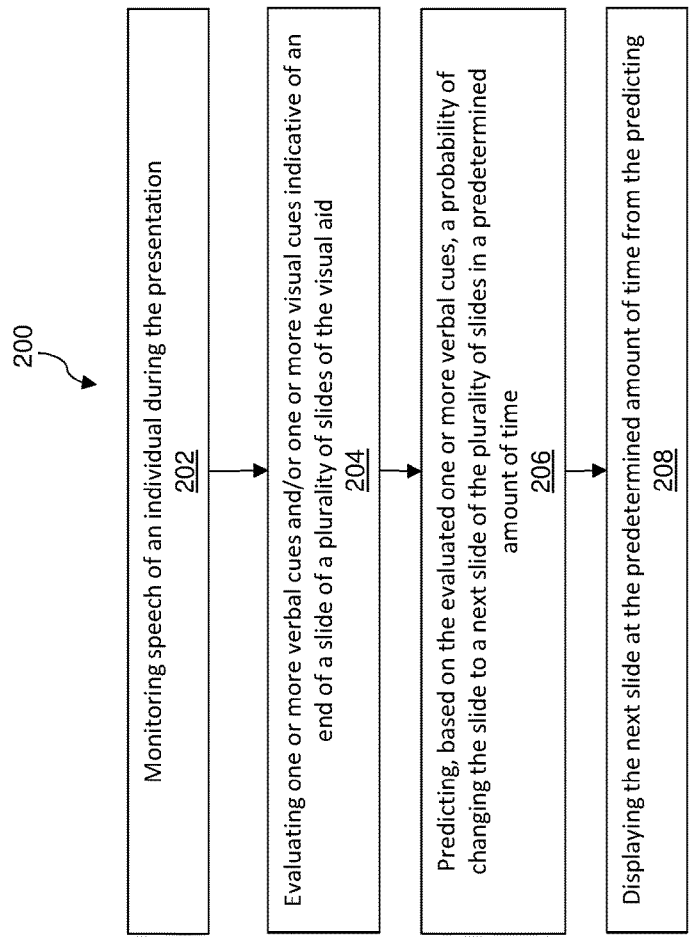
FIG. 2 depicts an example methodology for implementing the framework of FIG. 1 in accordance with one or more embodiments of the present invention.

Turning now to a more detailed description of aspects of the present invention, FIG. 1 sets forth a general framework for controlling navigation of a visual aid during a presentation according to one or more embodiments of the present invention. FIG. 2 illustrates an example methodology 200 in the context of the general framework set forth in FIG. 1. In regards to FIG. 1, the general framework set forth therein includes (A) comparing a slide time delta to an average slide time as compared to previous slides, (B) conducting NLP for keywords or word phrases, (C) conducting tone analysis, (D) conducting voice analysis to determine a gap in detected speech, and (E) performing image processing. Weights corresponding to (A)-(E) are ascertained and compared to threshold values to determine if a current slide is to be progressed.

In regards to FIG. 2, methodology 200 includes monitoring a speech of an individual during a presentation such as obtaining audio during a display of at least one slide of a plurality of slides of the visual aid. The individual's speech being monitored includes the presenter and/or other meeting participants. In some embodiments of the present invention, the presenter can selectively control whether the speech of other meeting participants will be monitored based on the environment and/or location of the presentation. For example, in a collaborative meeting in a congenial environment, the presenter may enable the monitoring of the speech of all of the meeting participants. However, in a large informational meeting in an unpredictable environment, the presenter may wish to select to only have the presenter's speech monitored.

At block 204, one or more verbal and/or visual cues indicative of an end of the current presented slide are evaluated, in which the evaluating is based, at least in part on, executing one or more machine learning algorithms or APIs, such as, for example, executing an NLP computing technique on the monitored speech during a display of the current slide. Some suitable non-limiting examples of the machine learning algorithms or APIs that can be used within the context of one or more embodiments of the present invention include Natural Language Understanding API, Tone Analyzer API, Visual Recognition API and/or Natural Language Classifier API provided by IBM® Watson™ Other suitable cognitive based algorithms or techniques may be used such that a nature of speech of audio content may be ascertained.

In some embodiments of the present invention, the evaluating of the one or more verbal clues includes extracting text data from the monitored speech, which includes spoken words or other sounds that are extracted from the monitored speech. In some embodiments of the present invention, the one or more verbal cues include monitoring speech for the presence of one or more keywords and/or one or more word sequences that are indicative of nearing the end of the currently displayed slide. The keywords can include, but are not limited to, one or more of next, previous, default, home, and last. In exemplary embodiments, the keywords may also relate to words that are associated with the content of the slide. These keywords can be set by the presenter and can be stored as metadata for each slide. In some embodiments of the present invention, one or more verbal cues includes word sequences, wherein the predicting is further based on an average word sequence frequency. In some embodiments of the present invention, the text data is extracted from the monitored speech via a speech-to-text technique such as via a speech-to-text API. One example suitable API is the Speech to Text API provided by IBM® Watson™. Other suitable types of speech-to-text algorithms or APIs may be used that allow for speech-to-text translation of audio data.

In some embodiments of the present invention, the one or more verbal cues include a similarity between spoken words of the monitored speech and text of one or more slides. For example, in some embodiments of the present invention, content of each of a plurality of slides of the visual aid is analyzed, in which spoken text similarity to context of text of the current slide is analyzed to identify whether the individual is nearing the end of the current slide, in addition to other cues. In some embodiments of the present invention, the analyzing includes both the content that will be displayed on each slide in addition to presenter notes for each slide that will not be displayed during the presentation.

In some embodiments of the present invention, the one or more verbal cues includes detecting a change in vocal tone of an individual (e.g., the presenter or a meeting participant), in which the detection is based, at least in part, on tone analysis of the monitored speech of the individual (e.g., via a Tone Analyzer API). The tone of an individual may change as the individual nears the end of a slide.

In some embodiments of the present invention, the one or more verbal cues include a silence of a predetermined amount of time, in which the silence is detected based, at least in part, on voice analysis of the monitored speech of the individual to detect gaps of speech. For example, in some embodiments of the present invention, methodology 200 includes detecting a brief silence within monitored speech and then using the detected brief silence as an indicator to process the visual aid to a next slide in the visual aid. In some embodiments of the present invention, the brief silence comprises a predetermined number of seconds such as, for example, five seconds.

At block 206, a probability of changing the slide to a next slide of the plurality of slides in a predetermined amount of time is predicted (e.g., n-seconds), in which the probability is predicted based, at least in part, on a combination of the evaluated one or more verbal cues via application of one or more machine learning techniques. At block 208, the next slide of the plurality of slides is displayed at the predetermined amount of time. In some embodiments of the present invention, the next slide is the next consecutive slide in the presentation. In some embodiments of the present invention, the next slide is a slide different from the slide that is consecutive to the current slide. For example, in some embodiments of the present invention, the presenter can specify one of the slides in a slide deck to be a default next slide that is to be displayed during the presentation. In some embodiments of the present invention, the predetermined amount of time is measured and/or ascertained in reference from the time of the predicting. Thus for example, if the predicting ascertains that the slide is to change within five seconds, then the visual aid is caused to change the currently displayed slide to the next slide at about five seconds unless a manual intervention is received from the presenter including voice-directed override.

In some embodiments of a present invention, methodology 200 further includes utilizing a camera detect visual cues indicating of an end of slide such as, for example, a hand slide to move to a next slide. In some embodiments of a present invention, methodology 200 includes further includes evaluating a cue based on a comparison of a cue that detected in a current slide to a cue detected from one or more previous slides. For example, in some embodiments of a present invention, an observed visual and/or verbal cue of a current side is compared to a previous average slide time (e.g., the amount of time a previous slide was displayed).

In some embodiments of the present invention, the evaluating of the verbal and visual cues and predicting of the slide change time includes generating a weighted probability score indicative of nearing the end of the current slide, in which the weighted probability score is based on a combination of a plurality of feature components such as, for example, as referenced above, results from one or more of: (A) comparing current slide time to an average slide time of prior slides, (B) conducting an NLP technique for keywords or word phrases, (C) conducting tone analysis, (D) conducting voice analysis, and/or (E) performing image processing. In some embodiments of the present invention, a next slide is presented in the visual aid upon a determination that the generated weighted score is greater than or equal to a predetermined minimum threshold. In some embodiments of the present invention, the predetermined minimum threshold is established via the application of one or more machine learning algorithms such as those known to persons having ordinary skill in the art.

In some embodiments of the present invention, thresholding logic that is used to generate generated the weighted probability scores and to determine whether the predetermined minim threshold is satisfied includes, for example analyzing spoken word to text similarity to determine being close to the end of a slide, and then utilizing word n-grams in a range of, for example, 1-grams to 4-gram word sequences in combination with their corresponding frequency weight average as indicators/predictors of being near the end of a currently displayed slide. In some embodiments of the present invention, word n-grams are used to find probability of progressing to the next slide in n seconds as opposed to predicting the next word. In some embodiments of the present invention, methodology 200 includes adjusting the n seconds dynamically based on an observed word pace of the individual. In some embodiments of the present invention, a detected change in tone of an individual indicates that a question that is posed by an audience member and an answer is anticipated by the speaker, and thus a slide transition may be paused. In some embodiments of the present invention, system observes an occurrence of certain keywords or word phrases and then seeks to detect a change in tone analysis at a first threshold time before voice analysis and imaging processing are performed at a second threshold time within a calculated predetermined slide time window (e.g., comparing a current slide time to average prior slide time times).

In some embodiments of the present invention, the thresholding logic updates the weights of each given feature component via one or more machine learning algorithms such as, for example, via supervised machine learning. For example, in some embodiments of the present invention, if any one of the feature components have not been individually shown to correlate to a number of previously slides, then the weight of the particular the feature component is decreased such that the predicting of the change of slide time is influenced less by that particular feature component, For feature components that have shown to be correlated to a number of previous slides, the weight of the feature may be increased. If a user manually intervenes to return the visual aid back to a prior current slide after the system having automatically transitioning to a next slide, then weight of a particular feature component is decreased as the automatic transition may have occurred too early as compared to the desire of the user. If user manually intervened to progress the current slide to the next slide, the weight of a particular feature component may increase as the automatic transmission may have been predicted to occur too late as compared to the desire of the user.

The following is an example non-limiting combination of events that may be supported by methodology 200 as implemented within the general framework as set forth in FIG. 1. In this example a current slide is progressed to a next slide within the context of the general framework of FIG. 1 upon the following combination of events occurring: (1) determining that the individual has spent more than thirty seconds on the current slide as compared to the average time spent on one or more previous slides (e.g., (A) comparing slide time delta to average); (2) detecting within the monitored speech that the individual spoke the phrase "and that is what I wanted to mention about this slide," in which the word "wanted" and the phrase "about this slide" are keywords or predetermined word phrases (e.g., (B) conducting NLP for keywords or word phrases); (3) detecting that the tone of the speaker has lowered as compared to average energy observed (e.g., (C) conducting tone analysis); (4) detecting that the individual has been silent for two seconds (e.g., (D) conducing voice analysis to determine brief gap); and (5) detecting that eye contact of the individual has changed in the last delta time and/or hands of the individual have been brought together (e.g., (E) performing image processing).

In another non-limiting illustrative scenario, a current slide is progressed to a next slide within the context of the general framework of FIG. 1 upon the following combination of events occurring: (1) determining that the individual has spent an average amount of time on the current slide as compared to prior slides (e.g., (A) comparing slide time delta to average); (2) detecting within the monitored speech that the individual spoke a transition phrase such as "and that brings us to" (e.g., (B) conducting NLP for keywords or word phrases); (3) detecting that the tone of the speaker is at an average level as compared to energy previously observed (e.g., (C) conducting tone analysis); (4) no time gap in speech of the speaker is detected (e.g., (D) conducting voice analysis to determine game); and (5) detecting that one hand of the individual is swept from one side to another (e.g., (E) performing image processing).

In another non-limiting illustrative scenario, a current slide is progressed to a next slide within the context of the general framework of FIG. 1 upon the following combination of events occurring: (1) determining that the individual is about to spend on the current slide the average amount of time of prior slides (e.g., (A) comparing slide time delta to average); (2) detecting within the monitored speech that the individual spoke a phrase that invites a question such as "any questions on this?" and then speaks a concluding phrase such as "OK let's move on" (e.g., (B) conducting NLP for keywords or word phrases); (3) detecting that the tone of the speaker is at an average level as compared to energy previously observed (e.g., (C) conducting tone analysis); (4) detecting brief silence in the monitored speech after the question is requested, which is indicative of no questions being asked (e.g., (D) conducting voice analysis to determine a gap); and (5) detecting glazing of eyes of one or more audience members (e.g., (E) performing image processing).

In another non-limiting illustrative scenario, a progression of a current slide is paused within the context of the general framework of FIG. 1 upon the following combination of events occurring: (1) determining that the individual is about to spend on the current slide the average amount of time of prior slides (e.g., (A) comparing slide time delta to average); (2) detecting within the monitored speech that the individual said a finalizing phrase such as "and questions on this?" (e.g., (B) conducting NLP for keywords or word phrases); (3) detecting that the tone of the speaker has changed, which may indicate that an audience member has asked a question to the speaker and that an answer is being waited for prior to proceeding to a next slide (e.g., (C) conducting tone analysis); (4) no gap in speech is detected, which may be indicative that a question is presently being posed by an audience member or an answer is presently being provided by the speaker to the audience member (e.g., (D) conducting voice analysis to determine a gap); and (5) detecting that the speaker is staring at a single location and not speaking, which may indicate that a question is still being presented to the speaker (e.g., (E) performing image processing).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
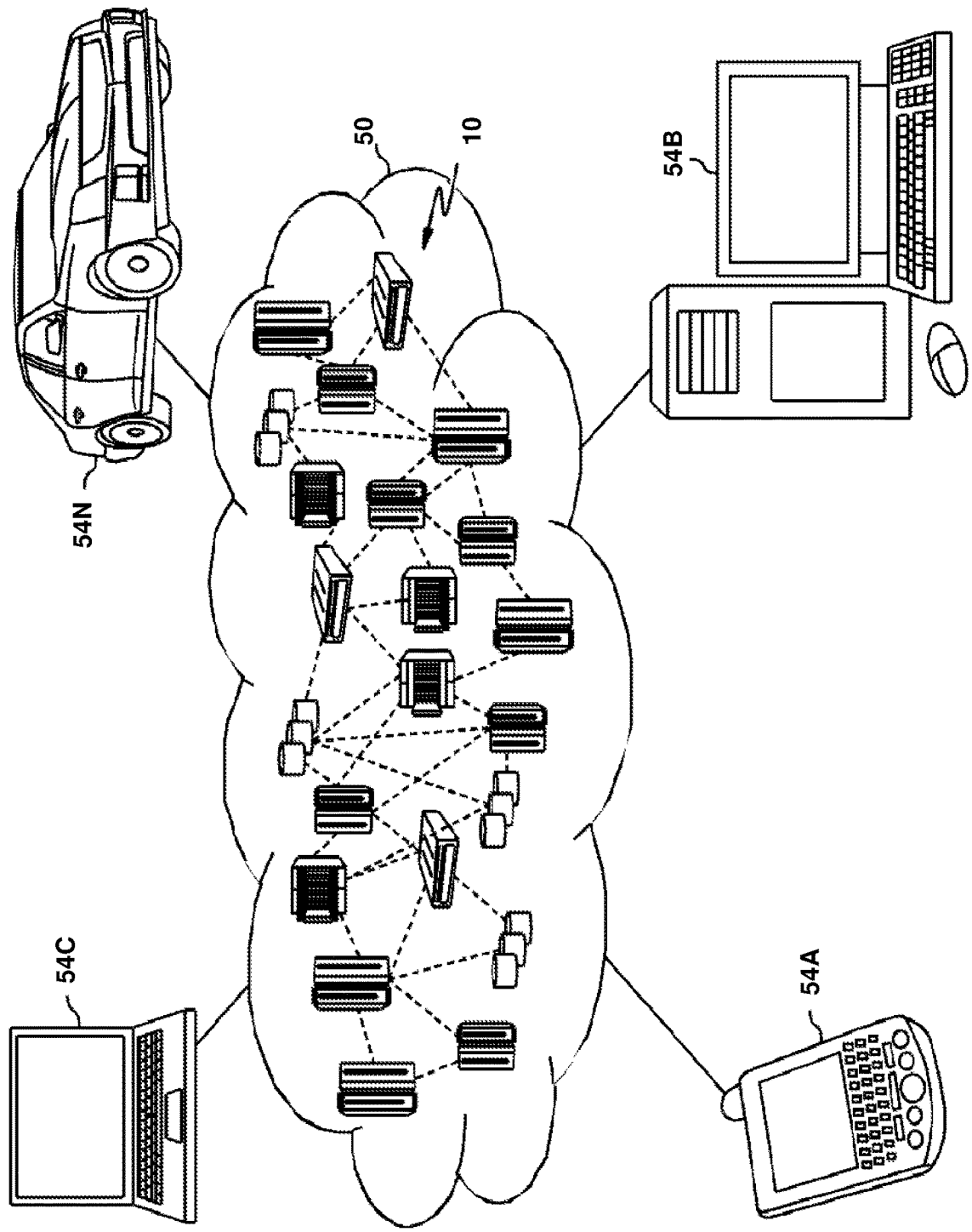
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
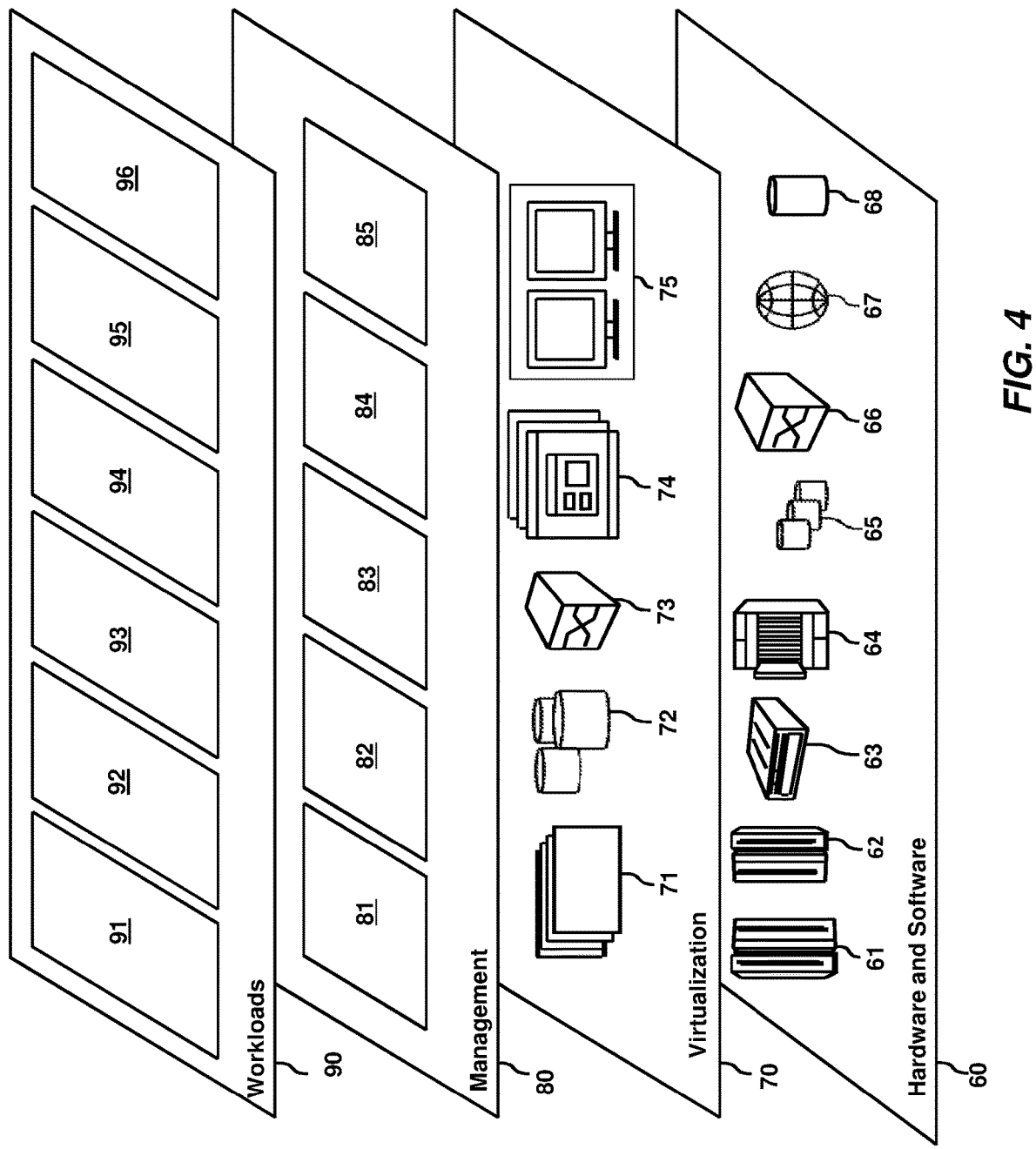
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visual aid presentation processing 96.

Figure 5:
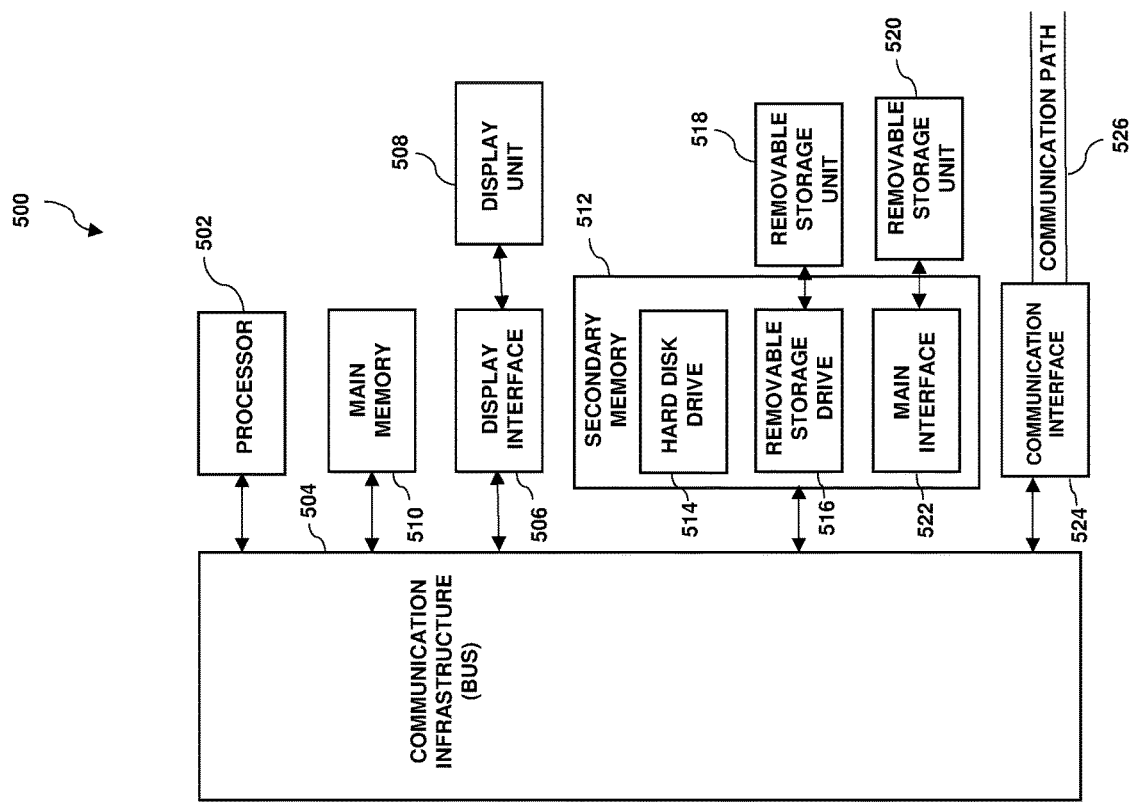
FIG. 5 depicts an exemplary computer system capable of implementing one or more embodiments of the present invention.

Turning now to a more detailed description of aspects of the present invention, FIG. 5 illustrates a high-level block diagram showing an example of a computer-based system 500 that is useful for implementing one or more embodiments of the invention. Although one exemplary computer system 500 is shown, computer system 500 includes a communication path 526, which connects computer system 500 to additional systems and may include one or more wide area networks (WANs) and/or local area networks (LANs) such as the internet, intranet(s), and/or wireless communication network(s). Computer system 500 and additional systems are in communication via communication path 526, (e.g., to communicate data between them).

Computer system 500 includes one or more processors, such as processor 502. Processor 502 is connected to a communication infrastructure 504 (e.g., a communications bus, cross-over bar, or network). Computer system 500 can include a display interface 506 that forwards graphics, text, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disk drive. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disk, etc., which is read by and written to by a removable storage drive 516. As will be appreciated, removable storage unit 518 includes a computer readable medium having stored therein computer software and/or data.

In some alternative embodiments of the invention, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PCM-CIA slot and card, etc. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 510 and secondary memory 512, removable storage drive 516, and a hard disk installed in hard disk drive 514. Computer programs (also called computer control logic) are stored in main memory 510, and/or secondary memory 512. Computer programs may also be received via communications interface 524. Such computer programs, when run, enable the computer system to perform the features of the present disclosure as discussed herein. In particular, the computer programs, when run, enable processor 502 to perform the features of the computer system. Accordingly, such computer programs represent controllers of the computer system.

Figure 6:
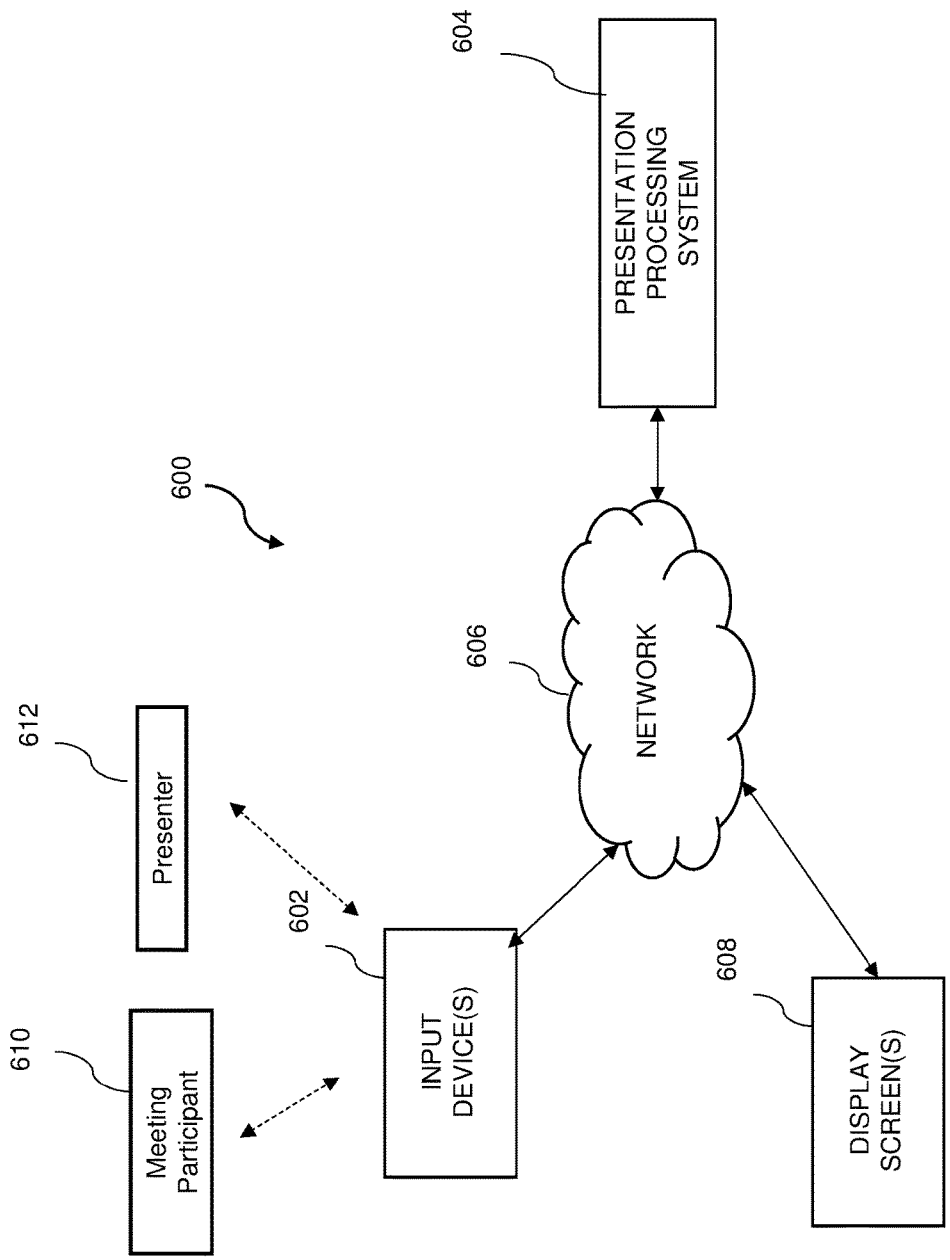
FIG. 6 depicts an exemplary distributed environment in accordance with one or more embodiments of the present invention.

Referring now to FIG. 6, an exemplary distributed environment 600 is presented for controlling navigation of a visual aid during a presentation. Distributed environment 600 includes one or more user input devices 602, a presentation processing system 604, and one or more display screens 608, which are interconnected via network 606. FIG. 6 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. Input device 602, presentation processing system 604, and display screen 608 employ hardware and/or software to solve problems that are highly technical in nature, that are not abstract and that cannot be performed as a set of mental acts by a human.

Input device 602 is generally configured to allow users of the devices to send and/or receive information to presentation processing system 604 and/or display screen 608. The users may include a presenter 612 of the presentation and/or meeting participants 610 of the presentation. In some embodiments of the present invention, input device 602 is a standalone computing device, a management server, a web server, a mobile computing device, or other suitable electronic device and/or computing system capable of receiving, sending, and processing data. In some embodiments of the present invention, input device 602 is a server computing system utilizing multiple computers, such as in cloud computing environment 50 (FIG. 3). In some embodiments of the present invention, input device 602 is a laptop computer, a tablet computer, a netbook computer, a personal computer (PC), a desktop computer, a personal digital assistant (PDA), a smartphone, or other suitable programmable electronic device capable of communicating with presentation processing system 604, display screen 608, and other computing devices (not shown) within distributed environment 600 via network 606. In some embodiments of the present invention, input device 602 is a computing system utilizing clustered computers and components (e.g., database server computers, application server computers, etc.) that act as a single pool of seamless resources that are accessible within distributed environment 600. In some embodiments of the present invention, input device 602 includes one or more sensors configured to capture a motion of a user of the input device (e.g., gyroscope, accelerometer, GPS, etc.). In some embodiments of the present invention, for example, input device 602 includes a microphone, or array of microphones, that is configured to capture the voice of the presenter 612, and/or other meeting participants 610 during the presentation. In some embodiments of the present invention, input device 602 includes a camera system that monitors the movements of the presenter 612 during the presentation. In a further embodiment, input device 602 is an electronic device that is held by the presenter 612 during the presentation, such as a clicker, a smartphone, or the like. As noted above, in some embodiments of the present invention, the electronic device includes an accelerometer and/or a gyroscope that provides indications of the one or more movements of the presenter 612. In some embodiments of the present invention, input device 602 is a wearable electronic device that is worn by the presenter 612 during the presentation. In some embodiments of the present invention, the wearable electronic device includes an accelerometer and/or a gyroscope that provides indications of the one or more movements of the presenter 612. In some embodiments of the present invention, input device 602 includes display screen 608. Input device 602 may have internal and external hardware components, such as those depicted and described above with respect to FIG. 5.

Network 606 can be, for example, a telecommunications network, a local area network (LAN), a wide area network (WAN), such as the Internet, or a combination of the three, and can include wired, wireless, or fiber optic connections. Network 606 can include one or more wired and/or wireless networks that are capable of receiving and transmitting data, voice, and/or video signals including multimedia signals that include voice, data, and video information. In general, network 606 can be any suitable combination of connections and protocols that can support communications between input device 602, presentation processing system 604, display screen 608, and/or other computing devices (not shown) within a distributed environment 600. For example, in some embodiments of the present invention, network 606 is a telecommunications network such as a cell phone network, a landline network, a packet-switch network, a public switched telephone network, or other suitable form of wireless or wired voice communication supporting network. In some embodiments of the present invention, distributed environment 600 is implemented as part of a cloud computing environment such as cloud computing environment 50 (FIG. 3).

In some embodiments of the present invention, presentation processing system 604 can be a laptop computer, a tablet computer, a netbook computer, a personal computer (PC), a desktop computer, a personal digital assistant (PDA), a smartphone, an Internet-of-things (IoT) enabled device, and/or other suitable programmable electronic devices capable of communicating with various components and devices within distributed environment 600 and controlling navigation of a presentation (e.g., controlling and/or presenting a slideshow). In some embodiments of the present invention, input device 602, presentation processing system 604, and display screen 608 are each a separate device. In some embodiments of the present invention, input device 602, presentation processing system 604, and display screen 608 are components of a single device. In some embodiments of the present invention, presentation processing system 604 is a programmable electronic mobile device or a combination of programmable electronic mobile devices capable of executing machine-readable program instructions and communicating with other computing devices (not shown) within distributed environment 600. In some embodiments of the present invention, presentation processing system 604 includes internal and external hardware components, such as those depicted and described above with respect to cloud computing environment 50 (FIG. 3).

In some embodiments of the present invention, display screen 608 may be a television, computer monitor, a projection screen, or the like. The content displayed on display screen 608 is controlled by presentation processing system 604. In some embodiments of the present invention, presentation processing system 604 is in communication with a projector, which projects content onto display screen 608. In some embodiments of the present invention, presentation processing system 604 communicates with display screen 608 to provide content to be displayed directly on the display screen 608.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling navigation of a visual aid during a presentation, the method comprising:
   monitoring, by a system comprising one or more processors, speech of an individual during the presentation;
   evaluating, by the system, one or more verbal cues indicative of an end of a slide of a plurality of slides of the visual aid, wherein the evaluating is based, at least in part, on executing natural language processing on the monitored speech during a display of the slide;
   predicting, by the system a probability of changing the slide to a next slide of the plurality of slides in a predetermined amount of time, wherein the probability is predicted based, at least in part, on the evaluated one or more verbal cues; and
   displaying, by the system, the next slide at the predetermined amount of time from the predicting,
   wherein the one or more verbal cues includes a change in vocal tone that is detected based, at least in part, on tone analysis of the monitored speech of the individual.

2. The computer-implemented method of claim 1, wherein the one or more verbal cues further includes a silence of a second predetermined amount of time that is detected based, at least in part, on voice analysis of the monitored speech of the individual.

3. The computer-implemented method of claim 1 further comprising:
   evaluating, by the system, one or more visual cues indicative of the end of the slide during the presentation, wherein the one or more visual cues are evaluated based, at least in part on, image processing that is applied to an image captured of the individual during the presentation, wherein the predicting is further based on the evaluated one or more visual cues.

4. The computer-implemented method of claim 3, wherein the one or more visual cues includes one or more physical gestures made by the individual during display of the slide, wherein the method further includes at least one of monitoring eye movement of the individual, comparing time spent on the slide to previous slides, checking text similarity between the slide and speech of the individual, or learning from incorrect transitions.

5. The computer-implemented method of claim 1, wherein the one or more verbal cues further includes a similarity between spoken words of the monitored speech and text of the slide.

6. The computer-implemented method of claim 5, wherein the one or more verbal cues further includes word sequences, wherein the predicting is further based on an average word sequence frequency.

7. A system for controlling navigation of a visual aid during a presentation, the system comprising one or more processors configured to perform a method comprising:
   monitoring, by the system, speech of an individual during the presentation;
   evaluating, by the system, one or more verbal cues indicative of an end of a slide of a plurality of slides of the visual aid, wherein the evaluating is based, at least in part, on executing natural language processing on the monitored speech during a display of the slide;
   predicting, by the system a probability of changing the slide to a next slide of the plurality of slides in a predetermined amount of time, wherein the probability is predicted based, at least in part, on the evaluated one or more verbal cues; and
   displaying, by the system, the next slide at the predetermined amount of time from the predicting,
   wherein the one or more verbal cues includes a change in vocal tone that is detected based, at least in part, on tone analysis of the monitored speech of the individual.

8. The system of claim 7, wherein the one or more verbal cues further includes a silence of a second predetermined amount of time that is detected based, at least in part, on voice analysis of the monitored speech of the individual.

9. The system of claim 7, wherein the method further includes:
   evaluating, by the system, one or more visual cues indicative of the end of the slide during the presentation, wherein the one or more visual cues are evaluated based, at least in part on, image processing that is applied to an image captured of the individual during the presentation, wherein the predicting is further based on the evaluated one or more visual cues.

10. The system of claim 9, wherein the one or more visual cues includes one or more physical gestures made by the individual during display of the slide, wherein the method further includes at least one of monitoring eye movement of the individual, comparing time spent on the slide to previous slides, checking text similarity between the slide and speech of the individual, or learning from incorrect transitions.

11. The system of claim 7, wherein the one or more verbal cues further includes a similarity between spoken words of the monitored speech and text of the slide.

12. The system of claim 11, wherein the one or more verbal cues further includes word sequences, wherein the predicting is further based on an average word sequence frequency.

13. A computer program product for controlling navigation of a visual aid during a presentation, the computer program product comprising a computer readable storage medium having program instructions embodied therewith, the program instructions executable by a system comprising one or more processors to cause the system to perform a method comprising:
   monitoring, by the system, speech of an individual during the presentation;
   evaluating, by the system, one or more verbal cues indicative of an end of a slide of a plurality of slides of the visual aid, wherein the evaluating is based, at least in part, on executing natural language processing on the monitored speech during a display of the slide;

predicting, by the system a probability of changing the slide to a next slide of the plurality of slides in a predetermined amount of time, wherein the probability is predicted based, at least in part, on the evaluated one or more verbal cues; and displaying, by the system, the next slide at the predetermined amount of time from the predicting, wherein the one or more verbal cues includes a change in vocal tone that is detected based, at least in part, on tone analysis of the monitored speech of the individual.

14. The computer program product of claim 13, wherein the one or more verbal cues further includes a silence of a second predetermined amount of time that is detected based, at least in part, on voice analysis of the monitored speech of the individual.

15. The computer program product of claim 13, wherein the method further includes:

evaluating, by the system, one or more visual cues indicative of the end of the slide during the presentation, wherein the one or more visual cues are evaluated based, at least in part on, image processing that is applied to an image captured of the individual during the presentation, wherein the predicting is further based on the evaluated one or more visual cues.

16. The computer program product of claim 15, wherein the one or more visual cues includes one or more physical gestures made by the individual during display of the slide, wherein the method further includes at least one of monitoring eye movement of the individual, comparing time spent on the slide to previous slides, checking text similarity between the slide and speech of the individual, or learning from incorrect transitions.

17. The computer program product of claim 15, wherein the one or more verbal cues further includes a similarity between spoken words of the monitored speech and text of the slide.

\* \* \* \* \*